June 27, 1944.  D. S. BARROWS  2,352,174
ANTI-SKIDDING DEVICE
Filed Nov. 6, 1941
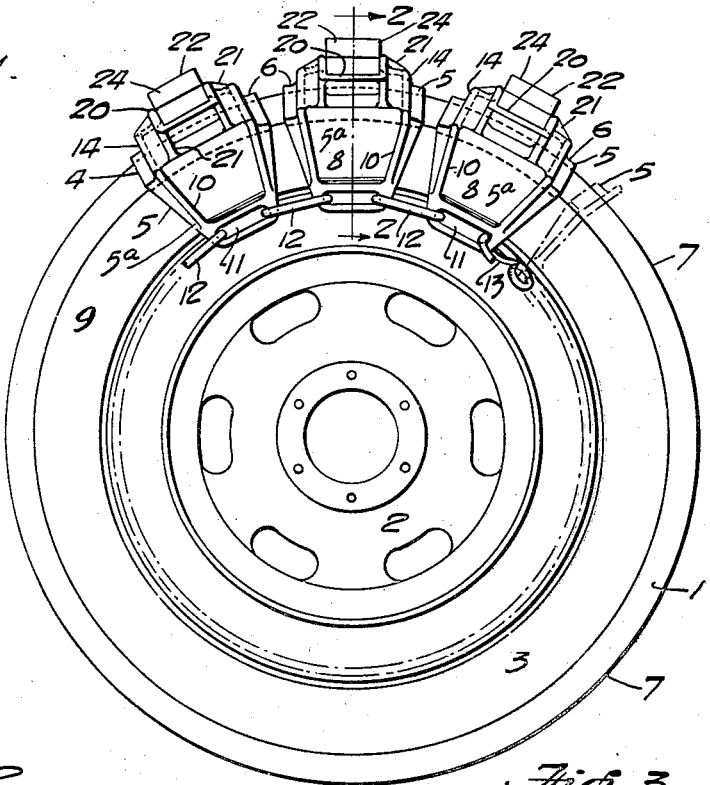
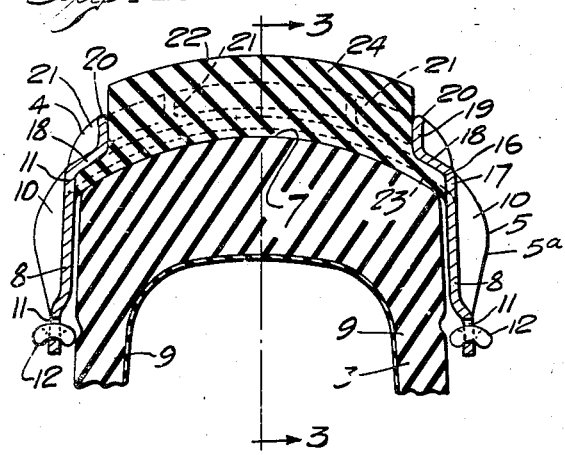
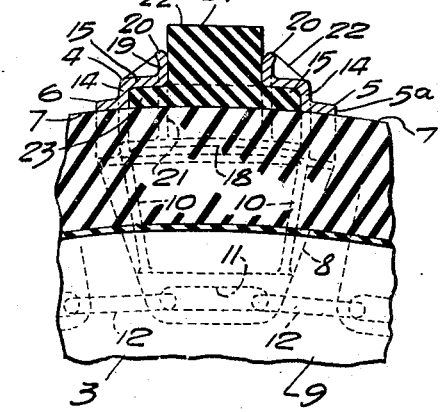
Inventor
Donald S. Barrows
By *[signature]*
his Attorney Patented June 27, 1944

2,352,174

UNITED STATES PATENT OFFICE 2,352,174

ANTISKIDDING DEVICE

Donald S. Barrows, Rochester, N. Y., assignor to The Symington-Gould Corporation, Rochester, N. Y., a corporation of Maryland Application November 6, 1941, Serial No. 418,079

2 Claims. (Cl. 152—226)

The invention relates to an anti-skidding or anti-slipping device for use with traction or motor vehicles such as automobiles, trucks or the like.

An object of the invention is the provision of a device particularly suitable for use with a wheel and, more specifically, a tire of a motor vehicle, to form a means to prevent a slipping or skidding action on snow, ice, mud or sand.

Another object of the invention is to provide resilient traction pads secured to holding means associated with a tire with the pads being so spaced about the periphery or circumference of the tire that they will effect an easy riding quality in the vehicle and, at the same time, present anti-slipping or anti-skidding means.

A further object of the invention is the provision of resilient traction pads removably associated or interlocked with substantially rigid attaching means so that, after continued use, the resilient pads may be replaced without rendering the entire assemblage useless or ineffective.

The above, as well as numerous other objects, will become apparent from the accompanying drawing which illustrates a construction and arrangement intended for the purpose of illustration only and not to be construed as a definition of the limits of the invention; reference being had to the appended claims for this latter purpose:

Figure 1 is a front elevational view of a vehicle wheel and tire assemblage having a form of the invention associated therewith;

Figure 2 is an enlarged cross sectional view taken along the lines 2—2 of Figure 1 looking in the direction of the arrows;

Figure 3 is a sectional view taken along the lines 3—3 of Figure 2 looking in the direction of the arrows.

Referring now in detail to the drawing wherein like reference characters indicate like parts, the numeral 1 is employed to designate, in a general manner, a vehicle wheel assemblage which includes a wheel proper 2, having secured thereto in any approved manner a tire 3 of commercial form. An anti-skidding or anti-slipping device 4 is extended along the circumference of the tire and is desirably made up of a multiplicity or plurality of units or items 5, each of which straddles or embraces a portion of the tire. Since all of the units or items are substantial counterparts of one another, only one of them will be specifically described and it will be understood that all of them are desirably of identical construction.

The unit or item is formed in part by a housing 5a which introduces into the unit a metallic element for the purpose of serviceability and rigidity and being preferably of cast material. The housing comprises an apertured base 6 adapted to lie in bearing relation with the tread 7 of the tire and extending to adjacent the transverse limits of the tread. Depending from the transverse extremities of the base plate are a pair of spaced arms or legs 8 which are positioned in the close proximity of associated side walls 9 of the tire with sufficient clearance therebetween to permit the side walls to flex or bulge outwardly in response to service loads without subjecting the arms or legs to abnormal stresses. Outstanding from each arm or leg are a pair of spaced reenforcing flanges 10 which not only rigidify the arms but also act as vanes, fingers or barriers adapted to increase the bearing area of the unit and prevent slippage. The innermost extremity of the unit arms is provided with a slot or elongated aperture 11 for the accommodation of a link 12 or any suitable type of connecting means which extends between adjacent housings to flexibly join them together and maintain the anti-slipping or anti-skidding device in assembled relation with a tire. Any means, such as the illustrated snap hook or latch 13, may be employed to form a detachable tension means capable of being manipulated to break the continuity of the device or join the housings forming the extremity of the device.

Upstanding perpendicularly from the base plate are transversely disposed ribs 14 which merge into side webs 15 extending toward one another from the ribs and are spaced from, but preferably parallel to, the tread of the tire to assist in forming a pocket 16. The upper or base plate adjacent extremity of the arms is in transverse alignment with the aperture of the base plate and extended as at 17 beyond the plane of the base plate at a height corresponding to the height of the ribs 14 and merge with the associated extremities of the ribs to present a hollow box-like structure. The arm extensions merge into end webs 18 which are also spaced from and parallel to the tread of the tire to join with the side webs to substantially complete the pocket and restrict its upper extremity. Defining the end of the pocket, and forming terminating elements of the side and end webs, is a throat, ring or continuous flange 19 projecting away from the tire and provided with a rolled angularly disposed or outwardly flared lip 20. The continuous flange is reenforced by means of perpendicularly disposed gussets 21 merging and formed integral with the side and end webs.

Positioned within the housing and maintained in assembled relation therewith is a pad or shoe 22 of resilient or compressible material such as a rubber compound or the like, and adapted to form an auxiliary supplemental anti-slipping or antiskidding tread for the tire. The shoe has an inner projection, seat or tongue 23 disposed within the housing pocket 16 and underlying the side and end webs in bearing relation therewith. The tongue is, when removed from the housing, or normal, of greater thickness than the height of the pocket or distance between the tread of the tire and the side and end webs so that upon application of the assemblage of units to a tire, the projections of all of the shoes will be precompressed to not only effect a gripping action by the tire and housing, but also utilize the inherent resiliency of the shoe projections to function as a resilient means for placing the connecting links 12 and snap hook 13 under tension. The shoe also includes a block or tread member 24 extending axially of the wheel from the shoe seat through the housing throat to project a predetermined distance beyond the ring and thus form the surface or ground bearing means for the device. As previously indicated, the lip 20 of the throat is inclined away from the interior of the throat and such a disposition of the metal will present a smooth edge against which the rubber block or shoe may bear during service without imparting any injury to the shoe.

Since the units are placed relatively close together, any rotative action of the vehicle wheel will result in the shoe tread members, in case the supporting surface is smooth and hard such as an improved roadway, being successively brought into contact with the roadway to effect a smooth riding quality in the vehicle, or, in other words, the close proximity of the shoes to one another permits the axle to move in a horizontal plane. This desired riding quality is opposed to a bumping or jolting action which would result from the units being spaced along the periphery of the tire to such an extent that the wheel would fall off of one shoe with the thread of the tire approaching the roadway and then be elevated by the next successive shoe being brought beneath the wheel. In the event the device is used in sand, mud or deep snow, it will be noted that each unit will present barriers or gripping means of appreciable extent to eliminate any slipping or skidding action of the wheel. Attention is directed to the fact that since the resilient shoes only come into contact with a hard surface, the use of the instant structure and relationship of parts will be relatively noiseless and breakage of the metallic elements will be reduced to an absolute minimum since they are spaced from and cannot come into direct contact with the hard surface of a roadway.

It will be noted from the above that various changes and alterations may be made to the illustrated and described construction without departing from within the spirit of the invention and the scope of the appended claims.

I claim:

1. In a device of the character described for use with a tire, the combination of a plurality of metallic housings each comprising an apertured base plate having spaced arms, reinforcing means extending along said arms, means flexibly connecting relating arms of said housings, means forming pockets in said housings, and resilient shoes associated with said housings; said shoes having tongues precompressed within said pockets and reacting against said tire through said apertures to retain said shoes in assembled relation with said housings and impart tensional forces to said connecting means.

2. In a device of the character described adapted to be associated with a tire, the combination of a plurality of housings, each comprising a base plate having spaced arms extending therefrom and disposed in telescoping relation with side walls of said tire, spaced reinforcing means extending along said arms, means flexibly connecting related arms of said housings, means upstanding from said base plates forming restricted pockets in said housings, resilient shoes associated with said housings, said shoes having projections positioned within said restricted pockets and being precompressed to impart tensional forces to said connecting means, and blocks outstanding from said projections to form an auxiliary tread for a tire.

DONALD S. BARROWS.